Figure 1:
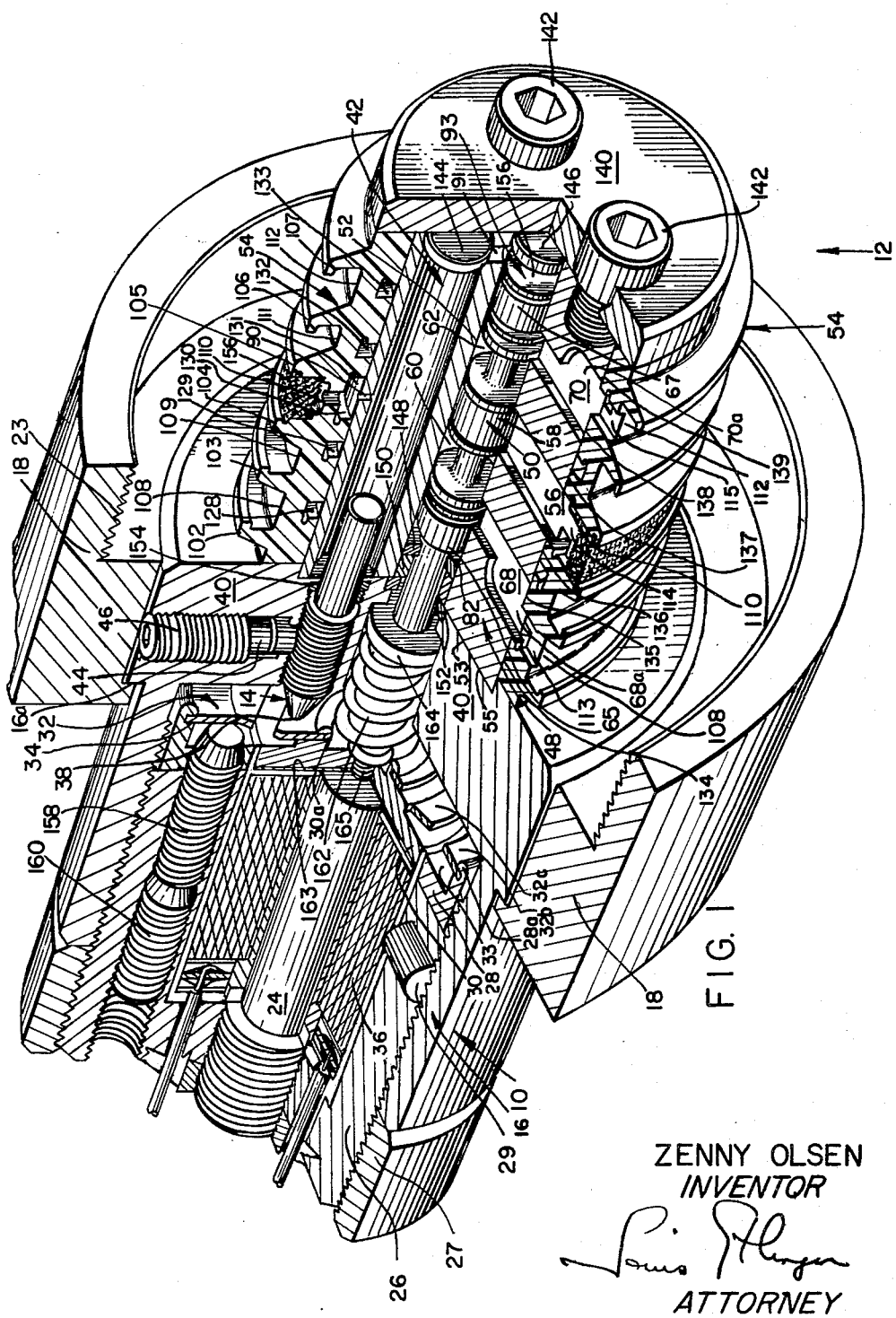

May 25, 1965  Z. OLSEN  3,185,167

ELECTRO-HYDRAULIC SERVO VALVE UNIT

Filed May 18, 1961  4 Sheets-Sheet 1

ZENNY OLSEN
INVENTOR

ATTORNEY

May 25, 1965         Z. OLSEN         3,185,167
ELECTRO-HYDRAULIC SERVO VALVE UNIT
Filed May 18, 1961         4 Sheets-Sheet 2

Zenny Olsen
INVENTOR
Robert O. Richardson
ATTORNEY

May 25, 1965            Z. OLSEN            3,185,167

ELECTRO-HYDRAULIC SERVO VALVE UNIT

Filed May 18, 1961                                          4 Sheets—Sheet 3

Zenny Olsen
*INVENTOR*

Robert O. Richardson
*ATTORNEY*

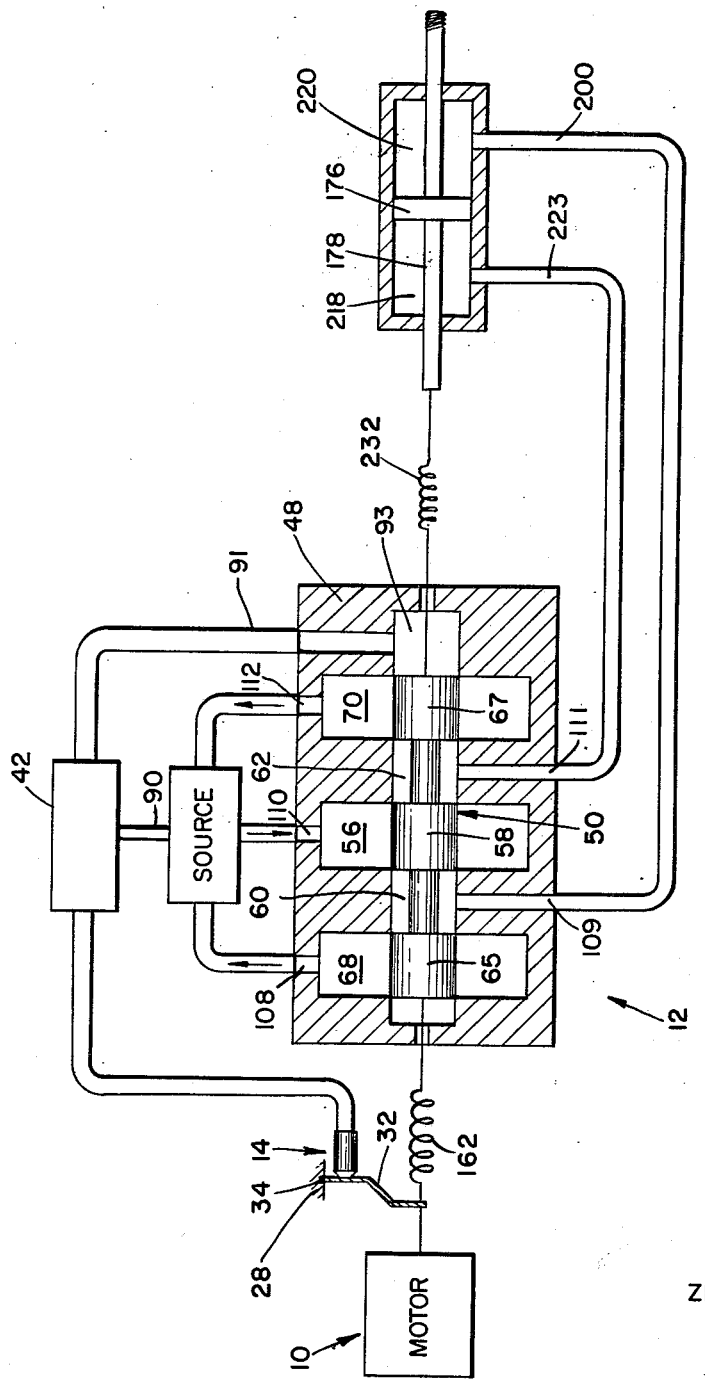

United States Patent Office 3,185,167
Patented May 25, 1965

3,185,167
ELECTRO-HYDRAULIC SERVO VALVE UNIT
Zenny Olsen, Nashua, N.H., assignor to Sanders Associates, Inc., Nashua, N.H., a corporation of Delaware
Filed May 18, 1961, Ser. No. 114,591
20 Claims. (Cl. 137—85)

This invention relates to an improved electro-hydraulic servo valve unit and to a hydraulic actuator assembly incorporating it. More specifically, it relates to a servo valve unit which can be plugged into a suitable receptacle to make all the required hydraulic connections in one simple operation. The actuator assembly has a compact in-line construction, with a novel direct mechanical feedback link between the actuator piston to the servo valve piston.

The conventional four-way hydraulic servo valve controlling a linear actuator or other type of hydraulic motor has four hydraulic connections, two to the motor and two to a hydraulic pump. In many cases, it is desirable that the valve be readily interchangeable with the replacement unit so that, in case of failure of the valve, the servo system will be inoperable for a minimum period of time. Prior to the present invention, interchangeability has required the use of accessible external coupling links for the hydaulic connections, even though, in many cases, it is desirable to incorporate the valve and motor in a single over-all housing.

The space requirement for a unit having external connections of this sort is substantially greater than the space required in many prior units having internal connections to the hydraulic motor. Furthermore, a substantial amount of time is required to couple and uncouple these connections, as well as remove the valve unit from its mounting and secure another unit to the mounting. However, prior to my invention, there has been no commercially practical, interchangeable unit having space-saving internal connections, as well as freedom from leakage under the substantial pressures which such valves operate.

Accordingly, it is a principal object of my invention to provide an improved electro-hydraulic servo valve-actuator system.

A more specific object of the invention is to provide an actuator system which is compact, reliable in operation and has a linear relationship between mechanical displacement and electrical signal input.

The invention accordingly comprises the features of construction, combinations of elements and arrangements of parts which will be exemplified in the constructions hereinafter set forth and the scope of the invention will be indicated in the claims.

In general, my servo valve unit includes a spool type main valve and a force motor axially aligned with the spool or piston of the valve. The force motor for cost reasons is preferably a single-ended unit, with the magnetic pull on an armature balanced by the force exerted by a spring. The spring also serves as a baffle cooperating with a nozzle to operate as a pilot valve for the unit. Fluid passing through the nozzle flows first through a restricted orifice into a chamber, whose pressure is applied to one end of the main valve piston. Changes in nozzle flow, following movement of the spring-baffle toward and away from the nozzle cause variations in the pressure in the chamber. The pressure variations, in turn, are tantamount to changes in the force applied to the end of the piston, resulting in movement of the piston for conventional flow control of the valved fluid. A feedback spring, axially disposed between the valved fluid and the force motor armature, linearizes displacement of the spool with respect to force motor input current. The entire hydraulic flow system related to pilot valve operation is contained within the valve body and the force motor housing in a novel arrangement, which, as shown below, provides a minimum size for these parts.

The various pressure, control and return ports in the valve unit extend through the valve body radially from the associated bore containing the piston. At the surface of the valve body, the ports are segregated from each other by a flexible sleeve seal provided with a series of circumferentially extending lands and grooves. The seal has apertures in the grooves communicating with the valve ports, and the lands are disposed between the ports to isolate them from each other when the valve is in operation.

More specifically, the value unit is installed by plugging the valve body, with the seal disposed around it, into a bore whose inner surface coincides with the lands on the seal. As explained below, the lands are so shaped that the pressures within the grooves in the seal urge them against the surface of the enclosing bore to completely prevent flow of hydraulic fluid from one groove to the next. Conduits, opening into the surface of this bore and aligned with the grooves in the sleeve seal, provide for hydraulic flow to and from the valve. Thus, effective connection is made to each of the five ports in a four-way valve in one simple operation, i.e., insertion of the valve body into a bore.

Various novel provisions have also been made for the prevention of fluid leakage at other points in the servo valve unit. As a result, the unit is much less susceptible to leakage under high pressures and after prolonged periods of storage and operation than conventional O-ring seals, which are prone to set or shed due to disintegration.

The valve unit is well suited for use in an actuator assembly. An actuator has, by its very nature, an elongated cylindrical shape to accommodate the reciprocating motion of a piston. The valve unit may be plugged into what is essentially an extension of the bore housing the system, to provide a compact assembly free of protuberances and, therefore, easily accommodated in tight quarters. Furthermore, with this design I have incorporated direct axial mechanical (force) feedback from the actuator system to the piston of the servo valve. The pivot points in normal external mechanical feedback linkages are thereby eliminated, thus reducing friction and the hysteresis associated therewith. The feedback system also has advantages over electrical feedback arrangements, including, among other things, lower cost reliability and fail-safe operation.

Figure 2:
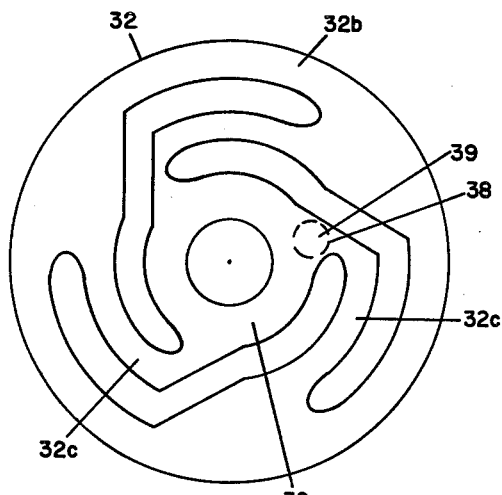
Figure 3:
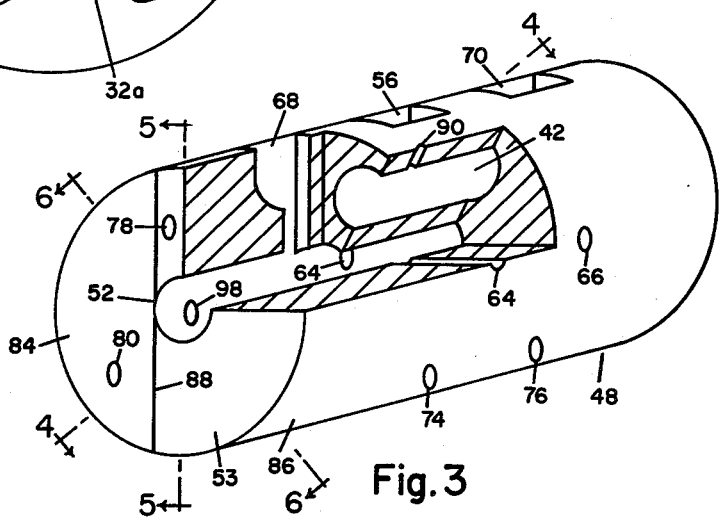
Figure 4:
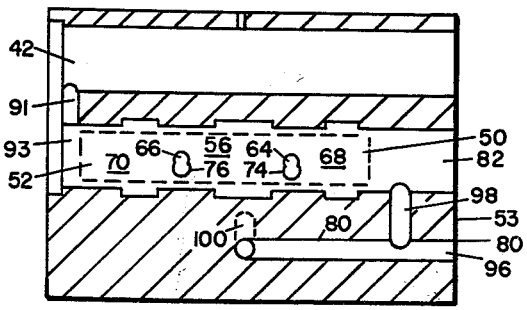
Figure 5:
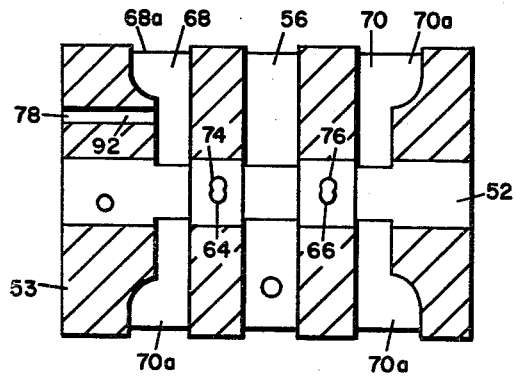
Figure 6:
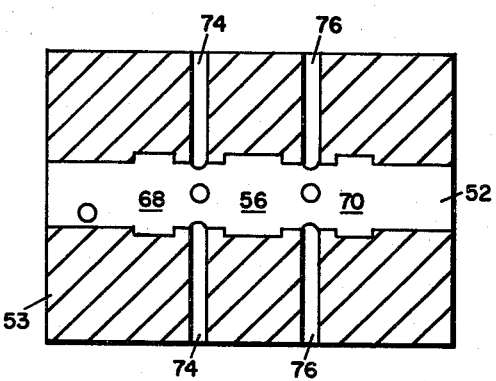
Figure 8:
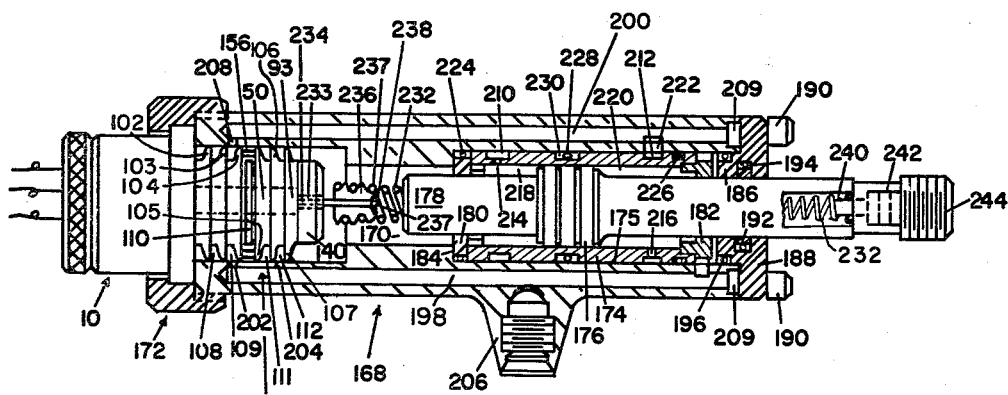
Figure 7:
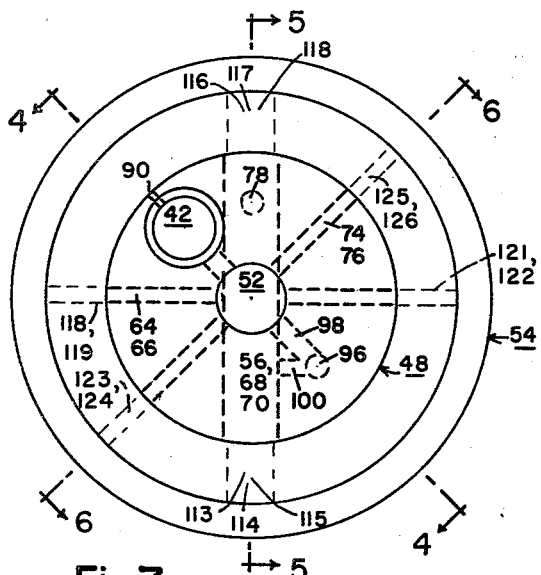

For a fuller understanding of the nature and objects of the invention, reference should be had to the following detailed description taken in connection with the accompanying drawings, in which:

FIGURE 1 is a perspective view of an electro-hydraulic servo valve unit embodying the invention, cut away to show various internal features of the unit, FIGURE 2 is a plan view of the baffle-spring used in the valve unit, FIGURE 3 is a perspective view, partly cut away, of the valve body of FIGURE 1, FIGURE 4 is a longitudinal section of the valve body taken along line 4—4 of FIGURE 3, FIGURE 5 is another longitudinal section of the valve body, taken along line 5—5 of FIGURE 3, FIGURE 6 is a third longitudinal section of the valve body, taken along line 6—6 of FIGURE 3, FIGURE 7 is a transverse section of the sleeve seal of FIGURE 1, FIGURE 8 is a longitudinal section of an actuator assembly incorporating one of my valve units, and FIGURE 9 is a schematic diagram of the actuator assembly of FIGURE 8.

As shown in FIGURE 1, my valve unit includes a force motor generally indicated at 10, which controls the operation of a servo valve generally indicated at 12 by means of a pilot valve, generally indicated at 14. The force motor and valve are held by a cup-shaped housing member generally indicated at 16, whose shoulder 16a cooperates with a locking ring 18 in securing the valve 12 within the bore of a manifold (not shown in FIGURE 1) by means of mating threads 23.

More specifically, the torque motor 12 has a pole piece 24 axially disposed within a cup-shaped permanent magnet 26. The magnet 26 is threaded into the housing 16 and secured therein by a lock nut 27. A nylon insert 29, bearing against the threads in the housing 16, seals the fluid flow atmosphere and helps prevent displacement of the magnet 26 under severe vibrational conditions.

A second pole piece of the motor 10 is provided by an annular member 28 secured to the rim of the magnet 26, and the magnetic circuit is completed by a disk-shaped armature 30 situated within the member 28. The armature 30 is suspended by means of a baffle-spring 32, whose outer edge is secured within an annular groove 34 formed in a lip portion 28a of the member 28. The inner edge of the baffle spring is secured to the armature 30 by swaging over the end of a short tubular portion 30a integral with the armature 30. The magnetic field supported by the magnet 26 attracts the armature 30 toward the pole piece 24 against the force exerted by the baffle-spring 32. Current through a coil 36 increases or decreases the magnetic pull on the armature, according to polarity. Coil 36 is of a dry coil construction which permits the use of electrolytic fluids thereby increasing the entire unit's utility in the field. The current thus determines the position of the axial position of the armature and, therefore, also the spacing of the inner baffle portion 32a of the spring 32 from the exit aperture of a nozzle 38 in the pilot valve 14.

As seen in FIGURE 2, the baffle-spring is in the form of a disk punched to provide an outer rim portion 32b and spring arms 32c, as well as the baffle portion 32a. Fluid from the nozzle 38 of a pilot valve impinges on the baffle portion in an area indicated at 39. The spring arms 32c permit elastically restrained, axial movement of the baffle portion with respect to the fixed rim portion 32b, toward and away from the nozzle 38.

In FIGURE 1 there is to be noted an area 33 in which fluid passing through nozzle 38 acts as a coolant for the force motor 10.

Returning to FIGURE 1, the nozzle 38 is threaded into an end wall 40 of the housing 16, and it extends through the wall from a chamber 42 within the valve 12. It is secured in place by means of a nylon plug 44 held against the nozzle threads by a set screw 46.

The valve 12 includes a valve body generally indicated at 48, a spool or piston 50 disposed within a central bore 52 in the body 48 and a sleeve seal, generally indicated at 54, extending around the body 48 and tightly engaging both the valve body and the manifold in which the valve is secured. The end 53 of the valve body 48 fits flush against the surface of a recess 55 in the end wall 40, where it is preferably brazed in place. An inlet or pressure port 56, connected to a hydraulic pump (not shown) in a manner to be described, is blocked by an enlarged portion 58 of the piston 50 when the piston is in the neutral position shown in FIGURE 1. Movement of the piston to the right or left permits communication between the port 56 and chambers 60 and 62 communicating with the exterior of the valve by way of a plurality of control ports, two of which are indicated at 64 and 66 in FIGURE 4. The piston 50 also has enlarged portions 65 and 67, blocking ports 68 and 70 when it is in the neutral position. Movement of the piston connects one or the other of the chambers 60 and 62 to a return port, depending upon the direction of displacement. The hydraulic circuitry involving the connections of the various ports of a servo valve to a hydraulic pump and motor are well known; a physical construction of such a circuit is described in detail below.

Referring to FIGURES 3 and 5, the ports 56, 68 and 70 extend all the way through the body 48 so as to open out on substantially opposite sides thereof and thereby maximize the flow area into and out of the valve by way of the ports. The ends 68a and 70a of the return ports 68 and 70 are enlarged to further facilitate flow.

As shown in FIGURES 3, 4 and 5, the valve body 48 has a second pair of control ports 74 and 76, axially aligned, respectively, with the ports 64 and 66 but angularly displaced therefrom. From FIGURE 6, it is seen that the ports 74 and 76 extend diametrically through the valve body 48; so also do the ports 64 and 66. Thus, there are four passageways leading from each of the chambers 60 and 62 (FIGURE 1) to the exterior of the valve body, again diminishing restriction of flow through the valve, except at the valving gaps between the enlarged portions of the piston 50 and adjacent portions of the body 48.

As best seen in FIGURES 3 and 5, the valve body 48 also includes a passage 78 connecting the end 53 of the body to the return port 68. The passage 78 is aligned with a passage (not shown) extending through the end wall 40 (FIGURE 1) of the housing 16 and thereby serves to vent the flow from the nozzle 38 back to the low pressure side of the hydraulic circuit.

A passage 80, shown in FIGURES 3 and 4, provides communication between the pressure port 56 and a chamber 82 in the bore 52 to the left (FIGURE 1) of the piston 50.

Preferably the valve body 48 is formed from two parts 84 and 86, joined along a plane indicated at 88 in FIGURE 3. Before the parts 84 and 86 are joined together, the ports 56, 68 and 70 are milled across the part 86 in the surface later to adjoin part 84. The chamber 42 is bored, and a small restriction orifice 90 is drilled from the exterior of the part 86 into this chamber. Another hole 91 (FIGURE 4) is drilled to communicate between the chamber 42 and a chamber 93 in the bore 52 to the right of the piston 50. The portions of the control ports 64, 66, 74 and 76 in the part 86 are also drilled.

In the part 84, the passage 78 is formed by drilling a longitudinal hole 92 connecting with the port 68. For the passage 80, longitudinal hole 96 (FIGURE 4) is drilled, and then transverse holes 98 and 100 are drilled to meet it. The portions of the ports 64, 66, 74 and 76 in this part are also drilled, and then the parts 84 and 88 are brazed together. Finally, the bore 52 is made.

Returning to FIGURE 1, the sleeve seal 54 has a plurality of circumferential lands 102–107, defining external groove 108–112, disposed over the various ports in the valve body 48. The seal 54 has holes aligned with the valve ports, connecting them to the respective external grooves. FIGURE 1 shows the holes 113, 114 and 115 connecting the ports 68, 56 and 70, respectively, with the grooves 108, 110 and 112. There are similar holes at the other ends of these ports connecting with the same grooves, and, furthermore, there are holes at the ends of the control ports 64, 66, 74 and 76 passing through the seal 54 to the grooves 109 and 111.

A more complete understanding of the arrangement of the various holes extending through the seal 54 may be obtained from FIGURE 7. As shown therein, holes 116–118 extend from the ends of the ports 56, 68 and 70 opposite from the holes 113–115. The control ports 64 and 66 connect with holes 119 and 120 at one end and hole 121 and 122 at the other end. Holes 123–126 are at the ends of the control ports 74 and 76. A hole 127 connects the orifice 90 to the pressure groove 110.

Returning to FIGURE 1, the manifold cooperating with the valve 12 has holes opening into the grooves 108–112 and communicating with the hydraulic motor or actuator with which the servo valve unit is associated. The holes may be located at any desirable angular position around the sleeve seal 54 and yet provide hydraulic flow through the holes in the seal by means of the chambers defined by the grooves 108–112 and the inner wall of the manifold. Thus, the valve unit may be plugged into the manifold bore to provide simultaneous connection to all the conduits between the valve 12 and other elements of the hydraulic circuit. The manner in which the grooves 108–112 are sealed from each other within the bore will now be described with reference to FIGURE 8, in which the valve 12 is disposed within the bore 170 of a manifold 168.

The outer surface of the seal 54, as defined by the outer edges of the lands 102–107, normally has a slightly greater diameter than the mating counterbore of the bore 170. Thus, when the valve 12 is inserted into the bore, the lands make a definite contact with the inner surface thereof. Furthermore, they are bent over slightly and, therefore, they exert a radial reaction force on the manifold, thereby closing it off where they contact it. However, this is not the only means by which sealing is accomplished between the lands and the surface of the bore. The difference in pressure between adjacent external grooves in the seal 54 is the predominant factor in the prevention of leakage from one groove to the next.

More specifically, as shown in FIGURES 1 and 8, the lands 102–107 do not extend in a strictly radial direction, but rather each one of them is formed essentially with a slant toward the pressure groove 110, i.e., in the direction of higher pressure.

During operation of the valve, the pressure in the pressure groove 110 is greater than the pressures in the control grooves 109 and 111. The latter pressures, in turn, are greater than the pressures in the return grooves 108 and 112. Thus, there is a difference in pressure across each of the lands 102–107, tending to bend the land away from the pressure groove 110. It will be apparent that, because of the slanting configuration of each of the lands, this tendency to bend will force the rims of the lands outwardly against the manifold 168 (FIGURE 8). The greater the pressure difference across one of the lands, the greater will be the effectiveness of the seal between the two grooves separated by the lands.

With further reference to FIGURE 1, the sleeve seal 54 operates in like manner to prevent leakage along the outer surface of the valve body 48. A plurality of inner annular grooves 128–133 in the sleeve seal 54 are disposed radially inwardly from the outer grooves 108–112. Each of the grooves 128–133 has an L-shaped cross section with a radially extending portion followed by an axially extending portion projecting in the direction of decreasing pressure, i.e., away from the pressure groove 110. This construction results in inner lands 134–139, contacting the valve body 48 and having concave surfaces facing in the direction of higher pressure. The pressure on the concave surface of each land tends to spread it apart, i.e., in the radial direction. This forces the lands against the surface of the valve body 48, thereby ensuring effective sealing along the surface thereof between the various ports. The effectiveness of the sleeve seal 54 along its inner surface may be enhanced by forming the seal with an inner diameter slightly less than the diameter of the valve body 48.

The sleeve seal 54 is preferably secured in place by an end plate 140, fastened to the valve body 48 by means of a plurality of screws 142. The plate 140 also closes off the ends of the chamber 42 and bore 52, with the aid of flexible button seals 144 and 146. The normal size of each of these disk-like seals in such as to provide a snug fit within the chamber in which it is disposed. During operation of the servo valve unit, the pressure in the chambers 42 and 93 is of the order of several thousand p.s.i., and the resulting force on the faces of the seals 144 and 146 squeezes the seals and causes them to try to expand in the radial direction. The forces resulting from the attempted expansion effectively prevent leakage of fluid from the chambers 42 and 93.

At the other end of the valve 12, the chamber 82 is sealed by means of the feed-through 148 abutting a bushing 150. The feed-through and bushing are retained in place against the pressure within the chamber 82 by a snap ring 152 in the end wall 40 of the housing 16. The feed-through has a roughly cup-shaped cross section, with the sides thereof being urged against the piston 50 and the wall of the bore 52 by hydraulic pressure. Another seal, indicated at 154, prevents leakage past the nozzle 38.

Operation of the servo valve unit is as follows. Hydraulic fluid from a pump or other pressure source enters the pressure groove 110 through a filter 156. The filter is preferably of sintered wire screen and is wrapped around in groove 110. The fluid then enters the pressure port 56 and, by way of the orifice 90, it enters the chamber 42. The pressure in the chamber 42 is communicated to the chamber 93 by way of the hole 91, and, in the chamber 93, it acts against the end 156 of the piston 50. At the same time, the full pressure from the source is communicated by means of the passage 80 to the chamber 82, where it acts against the end of the enlarged portion 65 of the piston 50.

It will be apparent that the area of the piston 50 against which the pressure in the chamber 82 is applied is substantially less than the area of the end 156. By way of example, the ratio between the two areas may be 2 to 1. In the absence of current flow in the coil 36, the flow through the nozzle 38 is such as to produce a pressure drop in the orifice 90 of sufficient magnitude to balance the disparity in piston areas. Thus, assuming the 2 to 1 area ratio, the pressure drop caused by flow through the orifice 90 is one half the input pressure appearing in the chamber 82. It follows that the pressure in the chambers 42 and 93 is one half the applied pressure, and the hydraulic forces acting in opposite directions on the piston 50 are balanced. The piston, therefore, remains in the neutral position.

Flow through the nozzle 38 in the quiescent condition of the valve unit may be regulated by means of a screw 158 threaded through the magnet 26 and bearing on the baffle spring 32. More specifically, rotation of the screw 158 moves the baffle spring toward or away from the tip of the nozzle 38 and thus alters the flow through the nozzle and changes the pressure in the chambers 42 and 93. The screw 158 is locked in place by a back-up screw 160. It should be noted that, with a pressure balance of this type, the piston 50 will remain in neutral position during moderate changes in supply pressure, since the pressures in the chambers 82 and 93 are both substantially proportional to the pressure in the pressure groove 110.

If a current is passed through the coil 36 in a direction causing movement of the armature 30 and a baffle-spring 32 to the left (FIGURE 1), flow through the nozzle 38 will increase, and the pressure in the chamber 42 and 93 will decrease. The pressure in the chamber 82 will thus cause the piston 50 to move to the right. Rightward movement of the piston 50 decreases the force exerted on the armature by a feedback spring 162 in compression between the armature 30 and a cap 164 on the end of the piston 50. The piston 50 continues to move to the right until the decrease in the force exerted by the spring 32 overcomes the increase in magnetic force on the armature 30 resulting from current through the coil 36. With these force increments balanced, the baffle spring 32 returns to its original position, the pressure in the chambers 42 and 93 increases, and the piston 50 stops at a new equilibrium position.

The negative feedback, effected by means of the spring 162, provides a linear relationship between displacement of the piston 50 and current in the coil 36, in the absence of other forces on the piston than those described above.

Reversal of the current in the coil 36, accompanied by rightward movement of the armature 30 and baffle spring 32 decreases flow through the pilot valve 14, with a resultant increase in pressure in the chambers 42 and 93. The piston 50 thereupon moves to the left, further compressing the spring 162 until the increase in the force exerted by the feedback spring offsets the decrease in the magnetic force exerted on the armature 32. The baffle-spring 32 then returns to its original position, and the pressure in the chambers 42 and 93 decreases to provide once again a balance between the hydraulic forces acting on the piston 50 in the chambers 82 and 93.

The use of a single-ended construction for the pilot valve 14 is of particular importance in minimizing the effect of small particles, which often interfere with pilot valve operation. Particles passing through the nozzle 38, which have a diameter smaller than the gap between the nozzle and the baffle-spring 32, exit through the gap without any difficulty. Larger particles become jammed in the working gap, restricting the normal fluid flow. This in effect results in an increase of pressure in the chambers 42 and 93, causing the piston 50 to move to the left. This movement increases the force exerted on the armature by feedback spring 162 until the gap becomes sufficiently large to pass the particle.

Accordingly, I have interposed a non-magnetic Belleville spring 163 between the armature 30 and pole piece 24. The spring 163, which is centered by a pin 165 extending through the armature and into the pole piece, is contacted by the armature when the latter enters the region where the magnetic pull increases at a greater rate than the force of the baffle-spring 32. Thus, when the armature enters this region, it encounters the additional stiffness of the spring 163, and this eliminates the instability From the above, further advantages of the servo valve unit construction will be apparent. In the first place, since sealing between the sleeve seal 54 and the manifold is largely effected by the very pressures contained by the seal, the manifold and the valve body 48, as well as the sleeve seal 54, may undergo differential thermal expansion and contraction without losing the effectiveness of the various seals. Thus, the valve body 48 may be made of relatively hard, non-corrosive stainless steel, as is desirable for such structures, while the manifold 168 may be of lightweight aluminum or magnesium, particularly desirable for aircraft applications. Another advantage stems from the use of a material such as nylon rather than an elastomer more like rubber for the sleeve 54.

Not to be overlooked is the compactness of the servo valve unit. A unit having the constructions shown in FIGURE 1 and having an outer diameter of approximately one inch and a length of approximately two inches is capable of effectively controlling a hydraulic output of two horsepower.

A variation in the construction illustrated in FIGURE 1 has the sleeve seal 54 and the outer portions of the valve body 48 formed as an integral nylon piece by injection molding. An insert in the form of a thin steel tube contains the bore 52, the two being milled to form parts connecting with the various pressure, control and exhaust ports in the nylon portion of the body. The inner and outer sealing surfaces of the nylon part are essentially the same as those illustrated in FIGURE 1. Thus, almost the entire valve body may then be formed in a low cost molding operation with a minimum of relatively costly machine work.

In FIGURE 8 I have illustrated in detail a hydraulic actuator assembly incorporating a servo valve unit of the type described above. This view is a longitudinal section of the assembly, and the portions on opposite sides of the axial center line are perpendicular to each other in the actual construction of the assembly.

As shown in FIGURE 8, the actuator assembly is housed in an aluminum manifold generally indicated 168. The manifold 168 has a central bore 170 counterbored at one end to receive a servo valve unit, generally indicated at 172, of the type described above. At the other end, the manifold 168 has a counterbore 175 containing a steel sleeve 174 in which a piston 176, integral with a hollow actuator shaft 178, reciprocates in response to hydraulic forces controlled by the valve unit 10.

More specifically, the sleeve 174 is disposed between a pair of shaft bushings 180 and 182. The inner bushing 180 abuts a shoulder 184 of the bore 70. At the other end of the sleeve 174, the bushing 182 is retained in place by an annular projection 186 extending inwardly from an end plate 188. The plate 188, which is secured to the manifold 168 by screws 190, is grooved to accommodate a low-friction glide ring 192 of polytetrafluoroethylene or other suitable material, backed up by O-ring gasket 194. The projection 186 is also grooved to accommodate an O-ring gasket 196 bearing against the surface of the counterbore 175.

The manifold 168 includes four longitudinally extending, circumferentially spaced passages connecting the servo valve unit 10 with other elements of the hydraulic system. Two of these passages are shown in FIGURE 8, viz., a return passage 198 and a control passage 200. Together with holes 202 and 204 in the manifold 168, the passage 198 provides communication between the return grooves 108 and 112 of the valve unit 10 and an internally threaded manifold port boss 206 used as part of a coupler connecting with the return line of a suitable pressure source. Similarly, a pressure passage (not shown) connects the pressure groove 110 of the valve unit with a second threaded boss. The control passage 200 is connected to the control groove 109 of the servo valve unit by means of a hole 208. At the right-hand end of the assembly, the passages are sealed by button seals 209, similar to those described above.

The connection of the passage 200 to the interior of the sleeve 174 will now be described in detail. As seen in FIGURE 8, the sleeve 174 is provided with external circumferential grooves 210 and 212, communicating by means of holes 214 and 216 with chambers 218 and 220 between the piston 176 and the bushings 180 and 182, respectively. The groove 212 is also connected to the control passage 200 by a hole 222 extending through the wall of the counterbore 175. Similarly, another hole (not shown) connects the groove 210 to a second control passage 223 (FIGURE 3) connected to the control groove 111 of the valve unit 172. Leakage from the grooves 210 and 212 by way of the ends of the sleeve 174 is prevented by O-ring gaskets 224 and 226, and a gasket 228 disposed in a circumferential groove 230 prevents leakage between the two grooves.

With reference to FIGURE 9, during operation of the actuator assembly, the servo valve 12 connects one of the chambers 218 and 220 to the pressure source and vents the other to the return. The resulting difference in pressure on the faces of the piston 176 imparts an axial motion to the piston 176 and shaft 178. The displacement of the piston 176 is linearized with respect to input current in the valve unit 172 by means of a novel feedback connection from the actuator shaft 178 to the valve piston 50. In particular, the feedback is effected by means of a spring 232 in tension between the shaft 178 and the piston 50. The spring 232, which also serves as centering device for the piston 50, replaces the passage 80 (FIGS 1 and 4) through which the input pressure is applied to the piston 50 in the chamber 82.

More specifically, as seen in FIGURE 8, a pin 233, suitably connected to the piston 50, extends through a seal 234 and a clearance hole 236 in the end plate 140 of the valve 12. A spring screw 236, retaining one end of the spring 232, is connected to the pin 233 by a self-aligning arrangement comprising a ball 237 secured to the end of the pin 233 and bearing against a depression 238 in the end of the spring screw. The diameter of the hole in the screw 236 is substantially greater than the diameter of the pin 233, to permit the spring screw to swivel about the ball 237. This minimizes the transmission of friction-creating lateral forces to the piston 50.

At its other end, the spring 232 is fastened to a spring screw 240 formed on the end of a slug 242 threaded into the end of the shaft 178. Rotation of the slug 242 varies the tension of the spring 232. A screw 244 bears against the slug 242 to secure it in place against vibration. A nylock seal contained in slug 242 prevents fluid leakage to atmosphere.

Thus, the tension in the spring 232 can easily be adjusted after the entire assembly is put together, and further adjustment is readily made in the field, if required. Further, since the bore in the shaft 178 has a larger diameter than the spring screw 236, the shaft may move over the spring screw, all the way in against the servo valve end plate 140, in one direction of travel.

Referring to FIGURES 3 and 4, the passage 80, by which input pressure is conducted to the chamber 82, is plugged when the servo valve unit is used in an assembly of the type shown in FIGURE 8. Furthermore, the chamber 82 (FIGURES 1 and 4) is preferably vented to the return groove 108 to prevent a buildup of pressure therein by eliminating feed-through and bushing 148 and 150.

Returning to FIGURE 9, the application of full pressure to one end of the valve piston 50 is replaced by tension in the spring 232. The tension of this spring is set at the point where, in the absence of input current in the force motor 10, the force exerted by the spring on the valve piston 50 offsets the pressure in the chamber 93, with the pistons 50 and 176 in their neutral positions.

Next, assume that an input signal is suddenly applied to the force motor 10, tending to move the valve piston 50 to the left (FIGURE 8). In short order, the following events will take place. First, the piston 50 will move to the left to a position determined by the force motor current with its resultant pressure buildup in chamber 93 of FIGURE 8, and the feedback, described above, between the piston 50 and the pilot valve 14 in the valve unit 10. (The slight stretching of the spring 232 at this point may be neglected for the purpose of this analysis.) The displacement of the piston 50 connects the chamber 218 of the actuator to the pressure source and vents the chamber 220 to the return, thereby causing the piston 176 to displace to the right. This stretches the spring 232, thereby increasing the force exerted by it on the piston 50. Displacement of the piston 176 continues until this force overcomes the pressure in the chamber 93, thereby returning the piston 50 to its neutral position and terminating flow of hydraulic fluid into and out of the chambers 218 and 220.

Referring once again to FIGURE 1, it will be apparent that, if valve piston 50 is secured in its neutral position during operation of the pilot valve 14, as is the case when the piston 176 of FIGURE 9 has come to rest in a position other than its neutral position, the feedback spring 162 will not exert an incremental feedback force on the armature 30 and baffle-spring 32. Accordingly, the baffle-spring 32, instead of returning to its neutral position, will retain the displacement dictated by the current through the coil 36 of the torque motor 10. The pressure in the chambers 42 and 93 is thus maintained at just the level required to offset the feedback force exerted by the piston 176 (FIGURE 9) and the spring 232 on the piston 50.

In other words, instead of using a stable reference, such as pressure in the chamber 82, to center the piston 50, the servo valve unit, when incorporated in the actuator assembly, uses a variable reference, i.e., the tension of the spring 232 (FIGURE 9). The pressure offsetting this reference, i.e., the pressure in the chambers 42 and 93, must vary with the reference force in order to center the piston 50.

Operation of the actuator assembly is, of course, symmetrical, that is, the same actions occur, though in different directions, when displacement of the actuator piston 176 is in the opposite direction.

Returning to FIGURE 9, it will be apparent that the displacement of the piston 176 in its final position is linearized with respect to the electrical input to the servo valve unit 172, by means of the above-described mechanical feedback. However, during the initial stages of movement of the piston 176, before the effect of the internal feedback within the valve unit 172 is eliminated, there is linearity of valve piston displacement with respect to electrical input, as described above. Since the rate of motion, i.e., velocity, of the piston 176 depends on the displacement of the valve piston 50, this permits close control of velocity by means of an extra electrical signal superimposed on the servo valve unit input current controlling the final position of the piston 176.

Among the important advantages of our actuator assembly, is the elimination of the external linkage, connected between the actuator shaft (178) and the pilot valve (14) found in many prior constructions. The linkage, which includes motion reducing devices such as cams and pivoted bars, is an element of substantial cost, and, furthermore, it introduces inherent response limitations caused by added friction and internal resonances. By applying feedback to the valve piston, instead of directly to the pilot valve, I have alleviated a great part of the problem of reduction of motion. The in-line actuator assembly configuration results in a substantially more compact construction than heretofore practical. For example, an actuator assembly of my design, having a diameter of one and a half inches and a length of six inches, excluding extension of the shaft 178, has output power comparable to prior units having a length of 12 inches and a transverse section measuring 10 inches by 6 inches.

It should also be noted that the compactness of my actuator assembly is due, in great part, to the construction of the servo valve unit 12. More particularly, it is due not only to the small size of the valve unit, but also the way in which it cooperates with the rest of the actuator assembly. For example, the pluggable type of construction and alignment of the axis of the valve piston 50 with the bore into which the unit is plugged facilitate connection of the feedback spring 232 between the piston 50 and the shaft 178 of the actuator.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A hydraulic actuator assembly comprising, in combination, a tubular housing having a bore extending therethrough, an electro-hydraulic servo valve having a first movable valving member disposed at one end of said bore, said first valving member being mounted for movement along the axis of said bore, movement of said first valving member controlling the flow of fluid between a valve input port and a first control port in said servo valve, a piston in said bore, means closing said bore on at least one side of said piston to form a pressure chamber between said piston and said bore closing means, means connecting said control port to said pressure chamber, said servo valve unit also including an electrical force motor, means forming a second chamber bounded in part by an axially facing surface of said first valving member, means admitting fluid under pressure to said second chamber, a pilot valve in said assembly and actuated by said force motor to control the pressure in said second chamber, a first negative feedback spring connected between said first valving member and said motor, and a second negative feedback spring connected between said first valving member and said piston.

2. The combination defined in claim 1 including a second control port in said valve unit, a third chamber on the opposite side of said piston from said first chamber, and means connecting said second control port to said third chamber, said first valving member controlling the flow of fluid between said input port and said second control port in an inverse relationship to the flow between said input port and said first control port.

3. A hydraulic actuator assembly comprising, in combination, a tubular housing having a bore extending therethrough, an electro-hydraulic servo valve unit including a valve having a first movable valving member, said first valving member being disposed for longitudinal movement in one end of said bore, a shaft in said bore, a piston on said shaft, a first bushing for said shaft sealing the other end of said bore, a second bushing for said shaft sealing said bore on the other side of said piston from said first bushing, thereby to form first and second chambers between said bushings and said piston, said valve having an input port and first and second control ports, movement of said valving member controlling the flow of fluid between said input and control ports, means connecting said first control port to said first chamber, means connecting said second control port to said second chamber, means forming a third chamber in said valve bounded in part by an axially facing portion of said valving member, means admitting fluid under pressure to said third chamber, an electrically powered force motor, a pilot valve having a second movable valving member actuated by said force motor and controlling the pressure in said third chamber, a first negative feedback spring connected between said shaft and said first movable member, and a second negative feedback spring connected between said first valving member and said second valving member.

4. The combination defined in claim 3 in which said control port connecting means are passages in the wall of said housing.

5. The combination defined in claim 3 in which said shaft is hollow, said first feedback spring extending through said shaft and connecting thereto at a position remote from the end thereof facing said movable valve member.

6. A servo valve unit comprising, in combination, a cylindrical body assembly having a longitudinal bore therein, a pressure port and a control port extending transversely from said bore, a piston in said bore having portions of relatively large and relatively small diameter disposed to control the flow of fluid from said pressure port to said control port upon longitudinal displacement of said piston in said bore, an elastic seal comprising outer circumferential lands on said body assembly defining grooves between them, said grooves being disposed over said ports, holes communicating between said grooves and said ports, said lands extending outwardly and axially in the direction of higher pressure when said valve unit controls flow between a source of pressure and a motor powered by said flow.

7. The combination defined in claim 6 including first and second control ports disposed axially on opposite sides of said pressure ports, the outer circumferential lands between said pressure port and said control ports sloping axially toward said pressure port.

8. The combination defined in claim 6 including in axial order along said body assembly a first return port, a first control port, a pressure port, a second control port and a second return port extending transversely from said bore, said outer lands defining grooves over each of said ports, each of said lands extending radially outwardly and axially toward said pressure port.

9. The combination defined in claim 6 in which said seal is of nylon.

10. The combination defined in claim 6 in which said body assembly includes a metallic body and a plastic sleeve seal circumferentially enclosing said body, said seal having internal circumferential grooves communicating with the ports in said body assembly, the internal lands between said internal grooves being concave in the direction of higher pressure.

11. The combination defined in claim 6 including means in said body assembly for admitting fluid under pressure against surfaces of said piston facing axially in opposite directions, an electrically operated motor and means controlled by said motor for varying the pressure on one of said surfaces.

12. A servo valve unit comprising, in combination, a cylindrical body assembly having a longitudinal bore therein, a plurality of ports extending transversely from said bore, a piston in said bore having a progression of portions of relatively large diameter and relatively small diameter so disposed as to control the flow of fluid between said ports and portions of said bore upon axial displacement of said piston, means sealing the ends of said bore to form first and second chambers bounded in part by surfaces of said piston facing axially in opposite directions, an external seal on said body assembly having circumferentially extending lands defining grooves between them, said grooves being disposed over and communicating with said ports, said lands extending from said grooves axially in the direction of higher pressure when said valve controls flow between a pressure source and a hydraulic motor, a restricted orifice communicating between one of said grooves and said first chamber, a pilot valve venting said first chamber, and an electrically actuated motor controlling the flow through said pilot valve to vary the pressure in said first chamber.

13. The combination defined in claim 12 including a passage in said body assembly communicating between one of said ports and said second chamber.

14. The combination defined in claim 12 in which said pilot valve has a movable member whose displacement determines flow through said pilot valve, resilient means positioning said pilot valve in a neutral position in the absence of current in said electric motor, said valve unit including a spring connected between said piston and said movable member, said spring being so connected that the force exerted on said movable member in response to displacement of said piston tends to return said movable member to said neutral position thereof.

15. The combination defined in claim 14 including a passage between said second chamber and the port in said body assembly communicating with the groove connecting with said orifice.

16. A servo valve unit comprising, in combination, a housing having a first wall, a cylindrical body assembly having an end secured to said wall, said body assembly having a longitudinally extending bore, said body assembly having in axial order a first return port, a first control port, an inlet port, a second control port and a second return port, said ports extending transversely from said bore, a piston disposed in said bore, said piston having portions of relatively large diameter interfitting with said bore and portions of relatively small diameter, said portions of said piston being so disposed as to control flow between said ports and said bore upon axial displacement for said piston, said body assembly having an outer circumferential seal, said seal having a plurality of circumferentially extending lands defining a plurality of grooves between them, said grooves being disposed over said ports and communicating with them, said lands extending axially toward said inlet port, means sealing the ends of said bore to form first and second chambers bounded in part by surfaces of said piston facing axially in opposite directions, a restricted orifice communicating between said first chamber and said groove opposite said inlet port, a nozzle venting said first chamber into the interior of said housing, a passage in said body assembly connecting said second chamber with said inlet port, a passage extending through said body assembly and said first wall connecting the interior of said housing with said first return port, a force motor disposed in said housing and having an armature mounted for axial movement with respect to said body assembly, a baffle attached to said armature and disposed closely adjacent the outlet of said nozzle, whereby movement of said armature moves said baffle toward and away from said nozzle to vary the flow through it, a spring connected between said piston and said armature and adapted to exert on said armature, in response to movement of said piston, a force counteracting the force exerted on said armature by said motor.

17. The combination defined in claim 16 including an end plate secured to the end of said housing assembly opposite said wall of said housing and a plastic disk interfitting with said bore and abutting said end plate.

18. The combination defined in claim 16 in which said body assembly comprises a metallic body including said ports, said chambers and said passages, said seal being in the form of a cylindrical plastic sleeve fitting over said body, said sleeve having circumferential internal grooves communicating with said ports and defining internal lands between them, said internal lands having concave surfaces facing axially in the direction of said inlet port.

19. The combination defined in claim 16 including means to cool said force motor.

20. The combination defined in claim 16 where said force motor is of a dry coil construction, thereby permitting the use of electrolytic fluid.

References Cited by the Examiner
UNITED STATES PATENTS

| | | | |
|---|---|---|---|
| 2,462,580 | 2/49 | Watson | 121—41 |
| 2,800,143 | 7/57 | Keller | 137—625.63 |
| 2,832,318 | 4/58 | Paine | 137—625.62 |
| 2,896,588 | 7/59 | Hayner et al. | 121—157 X |
| 2,933,106 | 4/60 | Gerwig et al. | 137—625.62 |
| 2,934,765 | 4/60 | Carson | 121—157 X |
| 2,939,430 | 6/60 | Westbury | 121—41 |
| 2,947,286 | 8/60 | Baltus et al. | 121—41 |
| 2,966,891 | 6/61 | Williams | 121—41 |
| 2,972,999 | 2/61 | Hayner | 121—157 X |

KARL J. ALBRECHT, *Examiner.*

M. CARY NELSON, *Primary Examiner.*